United States Patent Office 3,326,275
Patented June 20, 1967

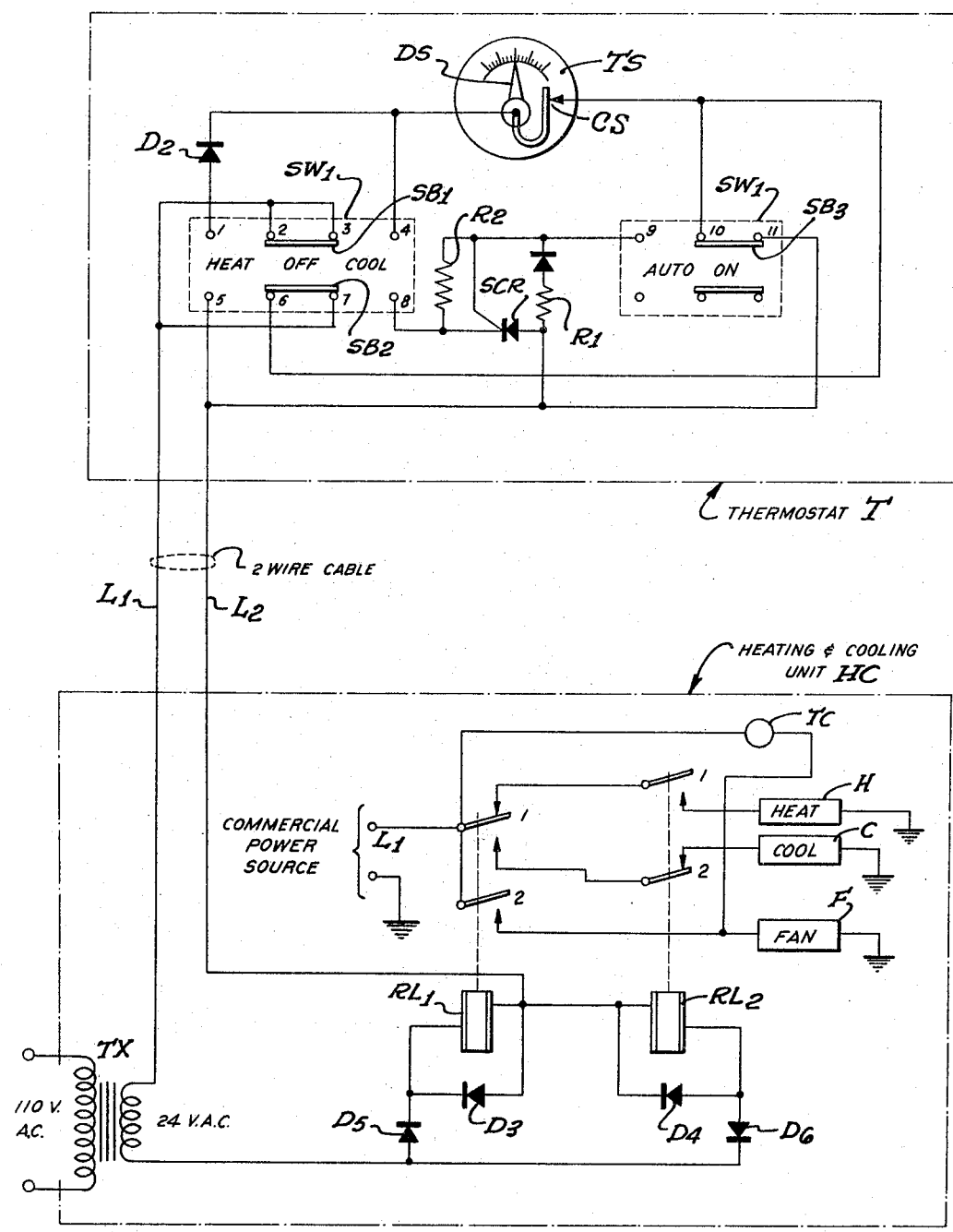

3,326,275
TWO-WIRE COMBINED HEATING AND COOLING THERMOSTAT SYSTEM
William Alton Ray, North Hollywood, Calif., assignor to International Telephone and Telegraph Corporation, New York, N.Y., a corporation of Maryland
Filed June 18, 1965, Ser. No. 465,105
5 Claims. (Cl. 165—26)

This invention relates in general to a combined heating and cooling thermostat system and in particular to a thermostat system of the above character in which only two wires interconnect the thermostat with an associated but remotely located heating and cooling unit. Its principal object is to provide the above thermostat system, which is reliable in operation and which is economical to install, both in new and existing buildings.

Many new and existing buildings are provided with a heating plant without cooling apparatus combined therewith. These heating plants are usually controlled over a single pair of wires extending between the heating plant and a heat thermostat located remotely therefrom. It is now quite common for existing heating plants to be modified to provide a cooling function as well as a heating function, which modification requires the heat thermostat to be replaced by a combined heating and cooling thermostat. In the past, this replacement required the addition of one or more control wires between the heating and cooling unit and the new combined thermostat since the thermostatic element is a heat responsive device which must, when in the heating mode, indicate a demand when actuated in one direction by the ambient temperature and must, when in a cooling mode, indicate a demand when actuated in a different direction by the ambient temperature. The cost of the installation of additional wires often became prohibitive, and when undertaken, usually resulted in temporary damage to the interior of the building.

The noted heating and cooling modes are selected by "heat" and "cool" switches which utilize respective pairs, or combinations, of the three or more control wires. Thus, prior to the present invention, the cost factor of providing the noted additional control wires often precluded modification of existing heating plants.

According to the present invention, the foregoing disadvantages are overcome by providing a thermostat system utilizing a combined heating and cooling thermostat which controls the combined heating and cooling plant over a single pair of wires. Thus, the aforementioned cost factor involved in installing additional wires is obviated in the case of conversion situations and also in cases of initial installations providing heating and cooling functions.

In carrying out the above objects, a multiplicity of control signals must be sent over a limited number of wires in order to control the heating unit when in the heating mode and similar signals when in the cooling mode, in addition to providing fan or blower control signals. Accordingly, it is another object of this invention to provide a two wire combined heating and cooling thermostat system in which both heating control and cooling control signals are transmitted over a single pair of wires.

A further object is to provide switching control apparatus in the thermostat housing which responds to the existing supply current normally provided in heating systems only.

A still further object is to provide the noted plurality of control signals over a signal pair of wires with the differentiation between signals being independent of voltage amplitudes since the length and resistance of the control wires will vary from one installation to another.

Still another object is to provide switching control components in the thermostat unit which do not require larger sized thermostat housings.

The foregoing and other objects and features of the invention will become apparent and the invention will be best understood when the specification and claims are read in conjunction with the accompanying drawing comprising a diagrammatic representation of a thermostat unit T interconnected with the heating and cooling unit HC over a single pair of wires L1 and L2.

A brief description of the invention will now be given.

The thermostat T comprises a housing containing a well known type of temperature responsive elements TS which responds to increases in ambient temperature by moving in one direction tending to open contacts CS and responds to decreases in ambient temperature by moving in a different direction tending to close contacts CS. The housing also contains a three-position switch SW1 having positions HEAT, OFF, and COOL and contains a two-position switch SW2 having positions AUTO and ON. A well-known temperature setting mechanism DS cooperates with the heat responsive element TS to select a position corresponding to a desired temperature, whether in the cooling mode or heating mode.

The heating and cooling unit HC consists of the usual heating unit H for heating purposes and a cooling unit C for cooling purposes. Also, an air circulating fan F is provided for controlling the movement of air across the heating unit or cooling unit through air ducts to the area containing the thermostat T. A pair of control relays RLY1 and RLY2 in the heating and cooling unit HC responds to signals from the thermostat T to selectively energize the heating and cooling units H and C. These relays also exercise direct control over the fan F in the cooling mode but in the heating more the fan F responds to control from thermocouple TC when the temperature of the heating unit H reaches a predetermined point. A conventional 24-volt alternating current source is connected to the system by transformer TX and commercial power is supplied to the heating unit H, the cooling unit C, and the fan F. As above noted, the thermostat T is interconnected with the heating and cooling unit HC by a single pair of wires L1 and L2.

When switch SW1 is in the OFF position and switch SW2 in the ON position, fan F is energized and continuously operates until switch SW2 is moved to the AUTO position or switch SW1 is moved to any position other than OFF. This permits circulation of air independently of either the heating unit H or the cooling unit C. For purposes of this description, the set of switch conditions will be termed the air circulating mode. At all other times, the switch SW2 is placed in the AUTO position.

When switch SW1 is in the HEAT position and switch SW2 is in the AUTO position, the heating unit H and fan F are energized when the ambient temperature of thermostat T is below the temperature setting of the thermostat T. Both the heating unit H and fan F are de-energized when the ambient temperature of the thermostat T is above the noted setting. It is to be noted that fan F is energized only when the temperature of the heating unit H is above a desired point and thus may operate after the heating unit H is energized and may continue to operate for a period of time after the heating unit H is de-energized. For purposes of this description, the above set of switch conditions will be termed the heating mode.

When switch SW1 is in the COOL position and switch SW2 is in the AUTO position, the cooling unit C and fan F are simultaneously energized when the ambient temperature of the thermostat T is above the noted temperature setting. Both the cooling unit C and fan F are de-energized when the ambient temperature is below the desired setting. This set of switch conditions will be termed the cooling mode.

It is to be noted that in the heating mode, a demand condition is established when the ambient temperature of the thermostat T drops below the temperature setting and in the cooling mode, a demand condition exists when the ambient temperature is above the noted setting. Thus, a single heat responsive element TS serves dual functions which are in direct opposition to each other. Suitable control components in thermostat T are provided for cooperating with the element TS according to the selected mode to transmit suitable controls over the two wires L1 and L2 to control the heating and cooling unit HC. A detailed description of the invention in performing the above described set of conditions will now be given.

AIR CIRCULATING MODE

In the air circulating mode, switch SW1 is in the OFF position and switch SW2 is in the ON position. An operating circuit is now completed for fan F as follows: Alternating current flows from one side of the secondary of transformer TX over wire L1 to switch terminal 7, through shorting bar SB2 to switch terminal 6 which is directly connected to switch terminal 10, through shorting bar SB3 to switch terminal 11, over wire L2, through the winding of both relays RLY1 and RLY2, and through oppositely poled diodes D5 and D6 to the other side of the secondary of transformer TX. The diodes D5 and D6 permit only half cycles of the alternating current to flow through the windings of the respectively corresponding relays RLY1 and RLY2, alternately energizing them. These relays are slow-release relays as indicated by the sleeved windings and thus remain operated from continuous half cycles.

Commercial power is now supplied through make contacts 2 of relay RLY1 to energize fan F. The operating circuit for the heating unit H is opened at break contacts 1 of relay RLY1 and the operating circuit for the cooling unit C is opened at break contacts 2 of relay RLY2. Thus, fan F only is energized. It is to be noted that the above described circuit is independent of element TS and thus the operation of fan F in the air circulating mode is independent of the ambient temperature of the thermostat T.

When the switch SW1 is moved to either the HEAT or COOL position, the shorting bar SB2 opens the connection between terminals 6 and 7 and thus releases relays RLY1 and RLY2, de-energizing the fan F. Similarly, movement of switch SW2 to the AUTO position opens the circuit between terminals 10 and 11 and causes relays RLY1 and RLY2 to restore.

HEATING MODE

In the heating mode, switch SW1 is in the HEAT position and switch SW2 is in the AUTO position. Assuming there is a heat demand condition, the contacts CS of element TS are closed as illustrated and heating unit H is operated as follows:

Half cycles of alternating current flow from one side of the secondary of transformer TX, over wire L1 to switch terminal 2, through shorting bar SB1 to switch terminal 1, through diode D2 and closed contacts CS of element TS to switch terminal 6, through shorting bar SB2 to switch terminal 5, over wire L2, and through the winding of relay RLY2 and associated diode D6 to the other side of the transformer secondary. Current does not flow through the winding of relay RLY2 since diode D5, oppositely poled to diode D2, precludes such current flow.

Relay RLY2 operates and remains operated from successive half cycles. Make contacts 1 of relay RLY2 close an operating current for heating unit H. Contacts 2 of relay RLY2 open the energizing circuit for cooling unit C.

The heat generated by unit H closes thermocouple TC which then connects fan F to the commercial power and causes it to operate and circulate heated air to the space containing thermostat T.

When the ambient temperature at thermostat T, from the heated circulating air, exceeds the thermostat setting as determined by dial DS, a demand condition no longer exists and element TS is operated opening contacts CS. When contacts CS are opened, the operating circuit for relay RLY2 is opened and relay RLY2 restores, de-energizing the heating unit H. When the temperature of the heating unit H decreases thereafter, thermocouple TC is opened and fan F is de-energized.

During the heating mode, actuation of switch SW1 to any other position than HEAT will open the above described connection and de-energize the heating unit H.

COOLING MODE

In the cooling mode, switch SW1 is in position COOL and switch SW2 is in position AUTO. In this mode, contacts CS of element TS will be open in a demand condition and closed in a no-demand condition.

Assuming a cooling mode demand condition, an operating circuit is closed for the cooling unit C and fan F as follows:

Alternating current flows from one side of the secondary of transformer TX over wire L1 to switch terminals 3 and 7 and appears on terminals 4 and 8 through respectively associated shorting bars SB1 and SB2. With contacts CS open under the assumed demand condition, no path exists for the alternating current appearing on switch terminal 4. Also, terminal 8 is connected to the cathode of a well known silicon controlled rectifier SCR which precludes current flow therethrough except in a triggered ON condition. A secondary path for the alternating current from switch terminal 8 includes resistance R2, diode D1 and resistance R1 in series to the junction point of the anode of rectifier SCR and wire L2. This path further extends over wire L2, through the winding of relay RLY1, and diode D5 to the other side of the secondary of transformer TX. Alternating current flows over this secondary circuit but the values of resistances R1 and R2 are so selected that the current flow is insufficient to operate relay RLY1. A potential now appears across the junction between cathode and gate electrodes of the rectifier SCR. As is characteristic of a silicon controlled rectifier connected as shown, the current flow through the junction between the cathode and gate electrodes, trigger the rectifier SCR to a conductive position on positive half cycles and maintains it conductive as long as the potential appearing thereon does not disappear or reverse its polarity. Thus, during the positive half cycles, the alternating current appearing on switch terminal 8 is passed through the rectifier SCR to wire L2. During the conductive condition, the resistance between the cathode and anode is very small and sufficient current flows through the above traced circuit of relay RLY1 and operates it. Make contacts 1 of relay RLY1 close an operate circuit for the cooling unit C and contacts 2 thereon close an operate circuit for fan F.

The silicon controlled rectifier SCR is repeatedly switched between conductive and non-conductive conditions in accordance with the frequency of the alternating current from transformer TX. As before noted, relay RLY1 is of the slow release type and remains operated during successive half cycles.

The cooled air from the cooling unit C is directed to the area containing the thermostat T and when the ambient temperature at thermostat T drops below the desired temperature setting, contacts CS are closed, indicating a no-demand cooling condition.

When contacts CS close, a path is closed from switch terminal 4, through contacts CS, switch terminal 10, and shorting bar SB3 to switch terminal 9. Since terminal 9 is connected to the gate electrode of the rectifier SCR and terminal 4 is connected to the cathode, the cathode and gate electrodes are at the same potential and current through the junction ceases. The rectifier SCR is thus driven to the non-conductive state and current therethrough is terminated.

Repeated demands and no-demands in the cooling mode successively energize and de-energize the cooling unit C and fan F.

The resistance R2 serves as a stabilizing resistor for the rectifier SCR while resistance R1 and diode D1 provide a blocking circuit to prevent negative half cycles from damaging the junction of the SCR.

While I have described my invention in conjunction with specific apparatus, it is to be understood that other components, circuitry, types of heat transfer and variations in heating and cooling units could be employed without departing from the spirit of the invention.

I claim:
1. A combined heating and cooling thermostat system comprising: selectively operable heating means and cooling means for heating and cooling a desired space; a thermostat unit in said space connected to said heating and cooling means over a two-wire connection; temperature setting means in said thermostat unit for selecting a desired ambient temperature; thermostatically controlled contact means in said thermostat unit operable to an open position responsive to the ambient temperature of said space rising above said desired temperature and operable to a closed position responsive to the ambient temperature of said space dropping below said desired temperature; control means having a heat selecting position and a cool selecting position; the closing and opening of said contact means with the control means in said heat selecting position, respectively closing and opening an operating circuit for said heating means over said two-wire connection; and by-pass means operable responsive to said control means being in its cool selecting position for closing an operating circuit for said cooling means over said two-wire connection when said contacts are in their open position with the closing of said contact means with the control means in said cool selecting position disabling said by-pass means to open said operating circuit of said cooling means.

2. A combined heating and cooling thermostat system as set forth in claim 1; a power source; first means for transmitting current on one polarity from said power source over said two-wire connection when said control means is in its said heat selecting position; and second means for transmitting current of an opposite polarity from said power source over said two-wire connection when said control means is in its said cooling selecting position.

3. In a combined heating and cooling thermostat system as set forth in claim 2; a first actuating device associated with said heating means and a second actuating device associated with said cooling means; the said transmission of current of one polarity over said two-wire connection operating said first actuating device and the said transmission of current of opposite polarity over said two-wire connection operating said second actuating device; a second power source; and switch means operable responsive to the operation of said actuating device for connecting said second power source to respective ones of said heating and cooling means.

4. In a combined heating and cooling thermostat system as set forth in claim 3, fan means associated with said heating and cooling means; fan control means in said thermostat unit for transmitting alternating current over said two-wire connection to operate said first and second actuating devices concurrently; and means including said switch means for connecting said second power source to said fan means independently of said heating and cooling means responsive to the said concurrent operation of said actuating devices.

5. A combined heating and cooling thermostat system as set forth in claim 1 wherein said by-pass means includes a silicon controlled rectifier connected in parallel circuit with said contact means and in series circuit with said two-wire connection whereby the said closing of the contact means short-circuits the said silicon controlled rectifier.

References Cited

UNITED STATES PATENTS

| | | | |
|---|---|---|---|
| 2,936,125 | 5/1960 | Leins | 236—68 |
| 3,157,801 | 11/1964 | Shequen | 236—68 |
| 3,159,212 | 12/1964 | Patrick | 165—26 |
| 3,241,603 | 3/1966 | Nagata | 62—3 X |
| 3,243,609 | 3/1966 | Kompelien | 165—26 X |

ROBERT A. O'LEARY, *Primary Examiner.*

M. A. ANTONAKAS, *Assistant Examiner.*